United States Patent
Sun et al.

(10) Patent No.: US 6,498,202 B1
(45) Date of Patent: Dec. 24, 2002

(54) INK JET INK COMPOSITIONS INCLUDING LATEX BINDER AND METHODS OF INK JET PRINTING

(75) Inventors: Jing X. Sun, Lexington, KY (US); Ajay K. Suthar, Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/460,754

(22) Filed: Dec. 14, 1999

(51) Int. Cl.$^7$ .................. C09D 11/10; C08L 33/08; C08L 33/12; C08L 25/14; B41J 2/01

(52) U.S. Cl. ............. 523/160; 524/560; 524/577; 347/100

(58) Field of Search ................. 523/160, 161; 106/31.6; 524/577, 556, 560; 526/318, 318.4, 329.2; 347/100

(56) References Cited

U.S. PATENT DOCUMENTS

| | | | |
|---|---|---|---|
| 4,419,481 A | * 12/1983 | Schwartz | 524/551 |
| 4,522,972 A | * 6/1985 | Mondt et al. | 524/548 |
| 5,084,505 A | * 1/1992 | Biale | 524/555 |
| 5,098,948 A | * 3/1992 | Kawabata | 524/522 |
| 5,100,469 A | * 3/1992 | Pontes et al. | 106/31.43 |
| 5,141,556 A | 8/1992 | Matrick | |
| 5,156,709 A | 10/1992 | Mammino et al. | |
| 5,160,372 A | 11/1992 | Matrick | |
| 5,180,425 A | 1/1993 | Matrick et al. | |
| 5,354,369 A | * 10/1994 | Shimomura et al. | 106/31.43 |
| 5,356,968 A | * 10/1994 | Rupaner et al. | 524/157 |
| 5,405,879 A | 4/1995 | Uemae et al. | |
| 5,460,874 A | 10/1995 | Rao | |
| 5,461,125 A | * 10/1995 | Lu et al. | 525/293 |
| 5,478,631 A | 12/1995 | Kawano et al. | |
| 5,500,668 A | 3/1996 | Malhotra et al. | |
| 5,537,137 A | 7/1996 | Held et al. | |
| 5,541,636 A | 7/1996 | Ingram | |
| 5,596,027 A | * 1/1997 | Mead et al. | 523/161 |
| 5,604,276 A | 2/1997 | Suga | |
| 5,616,364 A | 4/1997 | Cleary et al. | |
| 5,637,644 A | 6/1997 | Tsuruoka et al. | |
| 5,643,993 A | * 7/1997 | Guerin | 524/524 |
| 5,679,724 A | * 10/1997 | Sacripante et al. | 523/161 |
| 5,814,685 A | * 9/1998 | Satake et al. | 523/201 |
| 5,889,083 A | * 3/1999 | Zhu | 523/161 |
| 5,912,280 A | * 6/1999 | Anton et al. | 523/161 |
| 5,936,008 A | * 8/1999 | Jones et al. | 523/161 |
| 5,990,202 A | * 11/1999 | Nguyen et al. | 523/201 |
| 6,140,390 A | * 10/2000 | Bugner et al. | 523/160 |
| 6,147,139 A | * 11/2000 | Shaw-Klein et al. | 523/160 |
| 6,184,268 B1 | * 2/2001 | Nichols et al. | 523/160 |

FOREIGN PATENT DOCUMENTS

| | | |
|---|---|---|
| EP | 0606490 | * 7/1994 |
| EP | 0 851 010 A1 | 11/1997 |
| EP | 0 851 011 A2 | 11/1997 |
| EP | 0 851 012 A2 | 11/1997 |
| EP | 0 851 013 A2 | 11/1997 |
| EP | 0 851 014 A2 | 11/1997 |
| EP | 0 859 037 A1 | 2/1998 |
| EP | 0 867 484 A2 | 3/1998 |
| EP | 0984046 | * 3/2000 |
| JP | 354151446 A | 12/1997 |

* cited by examiner

*Primary Examiner*—Vasu Jagannathan
*Assistant Examiner*—Callie E. Shosho
(74) *Attorney, Agent, or Firm*—Dinsmore & Shohl, LLP; Jacqueline M. Daspit

(57) ABSTRACT

Aqueous ink jet ink compositions comprise pigment, humectant, dispersant, and latex binder. The latex binder is formed from first monomer having a glass transition temperature Tg greater than about 70 C and comprising styrene, substituted styrene, methyl methacrylate, or a mixture thereof, second monomer having a glass transition temperature Tg less than about 0 C and comprising a $C_2$–$C_{10}$ alkyl acrylate, charge stabilizing agent, emulsifier and initiator. The latex binder has a glass transition temperature Tg of from about 0 C to about 70 C, an average particle size of from about 150 nm to about 350 nm, and a surface tension of from about 40 dynes/cm to about 60 dynes/cm. Methods of ink jet printing comprise ejecting a droplet of an aqueous ink jet ink composition containing a latex binder through a nozzle and onto a surface of a paper recording medium, and optionally passing the paper recording medium with the aqueous ink jet ink composition on a surface thereof through a fuser system at a temperature greater than about 100 C for about 5 to about 100 seconds.

25 Claims, No Drawings

INK JET INK COMPOSITIONS INCLUDING LATEX BINDER AND METHODS OF INK JET PRINTING

FIELD OF THE INVENTION

The present invention is directed to aqueous ink jet ink compositions which include latex binder and which exhibit an advantageous combination of good optical density, good print quality and good wet-rub resistance. The present invention is also directed to latex binders for use in aqueous ink jet ink compositions and ink jet printing methods, and to methods of ink jet printing, which methods provide printed mediums having an advantageous combination of good optical density, good print quality and good wet-rub resistance.

BACKGROUND OF THE INVENTION

Ink jet printing is a well known process and generally comprises ejecting a droplet of an ink composition through a fine nozzle to record images on a surface of a recording medium. Typically, paper recording mediums are employed although other polymer based film recording mediums have also been used. High quality printing and relatively low noise operation have made ink jet printers particularly advantageous.

Dyes and/or pigments are typically used as colorants in ink jet ink compositions. While dyes often provide very good color properties immediately after printing, they are often light sensitive so that printed images tend to fade after time. Dyes can also remain water soluble after printing, whereby printed images smear when contacted with moisture. On the other hand, pigment colorants often exhibit improved light-fastness and water-fastness as compared with dyes. Typically, a pigment is employed in combination with one or more polymeric dispersants in ink jet ink compositions in order to form a stable dispersion of the pigment particles in the ink.

While inks containing pigment colorants generally exhibit improved water-fastness as compared with inks containing water-soluble dyes, it is often desirable to further improve the water-fastness of pigment-containing ink jet ink compositions, particularly for end-use applications where a printed recording medium may be exposed to high moisture and/or humidity conditions. The water-fastness is often measured as wet-rub resistance.

Recently, various latex binders have been employed in attempts to improve the water-fastness of ink jet ink compositions which contain pigment colorants. Oftentimes, however, a latex binder which improves the wet-rub resistance of an ink jet ink composition is not suitable for use in the ink jet print head nozzles and causes printer maintenance problems. Typically, the print head nozzles have diameters of less than about 30 $\mu$m and relatively high temperatures are employed to eject the ink compositions from the nozzles. Under the high temperature conditions, many latex binders form a film on the nozzle plate, resulting in clogging of the nozzle and printhead failure, so that extra maintenance of the printer is often required.

Accordingly, pigment-containing ink jet ink compositions which exhibit good printing properties, particularly in terms of print quality and optical density, which have improved wet-rub resistance, and which are suitable for substantially maintenance-free use in conventional ink jet printing systems are desired. Additionally, substantially maintenance-free printing methods which provide printed recording mediums having good print quality, good optical density, and good wet-rub resistance are desired.

SUMMARY OF THE INVENTION

It is therefore an object of the present invention to provide improved ink jet ink compositions. It is a more specific object of the invention to provide ink jet ink compositions which exhibit good optical density and good print quality. It is a further object of the invention to provide such ink jet ink compositions which also exhibit improved wet rub resistance. It is a related object of the invention to provide latex binders for use in ink jet ink compositions and, particularly, for improving wet rub resistance of ink jet ink compositions. It is a further object of the invention to provide improved methods for ink jet printing, which methods employ pigment-containing ink jet ink compositions having latex binder therein.

These and additional objects and advantages are provided by the present invention. In a first embodiment, the invention is directed to aqueous ink jet ink compositions which comprise pigment, humectant, dispersant and a latex binder. The latex binder is formed from first monomer having a glass transition temperature Tg greater than about 70° C. and comprising styrene, substituted styrene, methyl methacrylate, or a mixture thereof, second monomer having a glass transition temperature Tg less than about 0° C. and comprising a $C_2$–$C_{10}$ alkyl acrylate, charge stabilizing agent, emulsifier and initiator. The latex binder has a glass transition temperature Tg of from about 0° C. to about 70° C., an average particle size of from about 150 nm to about 350 nm, and a surface tension of from about 40 dynes/cm to about 60 dynes/cm. In a further embodiment, the invention is directed to methods of ink jet printing, which methods comprise ejecting a droplet of an aqueous ink jet ink composition as described through a nozzle and onto a surface of a paper recording medium. These compositions and methods provide an advantageous combination of good optical density, print quality and wet-rub resistance.

The present invention is also directed to latex binders formed by emulsion polymerization and suitable for use in ink jet ink compositions. The latex binders are formed by emulsion polymerization of first monomer having a glass transition temperature Tg greater than about 70° C. and comprising styrene, substituted styrene, methyl methacrylate or a mixture thereof, second monomer having a glass transition temperature Tg less than about 0° C. and comprising a $C_2$–$C_{10}$ alkyl acrylate, charge stabilizing agent, emulsifier and initiator. The latex binders have a glass transition temperature Tg of from about 0° C. to about 70° C., an average particle size from about 150 nm to about 350 nm, and a surface tension of from about 40 dynes/cm to about 60 dynes/cm.

In a further embodiment, the invention is directed to methods of ink jet printing, which methods comprise ejecting a droplet of an aqueous ink jet ink composition through a nozzle and onto a surface of a paper recording medium, and passing the paper recording medium with the aqueous ink jet ink composition on a surface thereof through a fuser system. The fuser system is operated at a temperature greater than about 100° C., and the paper recording medium is passed through the fuser system for about 5 to about 100 seconds. The aqueous ink jet composition employed in these methods comprises, by weight, from about 1% to about 20% pigment, from about 5% to about 50% humectant, from about 0.01% to about 10% dispersant, and from about 1% to about 20% of an emulsion polymerized latex binder having a glass transition temperature Tg of from about 0° C. to about 70° C. and a particle size of from about 150 nm to about 350 nm. These methods provide printed recorded mediums having an advantageous combination of good optical density, good print quality and good wet-rub resistance.

Additional embodiments, objects and advantages of the present invention will be more further apparent in view of the following detailed description.

DETAILED DESCRIPTION

The aqueous ink jet ink compositions and the ink jet printing methods according to the present invention provide printed recording mediums which exhibit good optical density, good print quality and good wet-rub resistance.

The aqueous ink jet ink compositions comprise pigment, humectant, dispersant and latex binder in an aqueous medium. The aqueous medium may comprise water, preferably distilled and/or deionized water, or may comprise water in combination with one or more water-miscible organic oils or solvents. In a preferred embodiment, the aqueous medium is deionized water.

A wide variety of organic and inorganic pigments are known in the art for use in ink jet printing systems and are suitable for use in the compositions of the present invention, alone or in combination. The pigment dispersion particles must be sufficiently small to permit free flow of the ink through the ink jet printing device, and particularly the ink jet print nozzles, which typically have diameters in the range of from about 10 to about 50 $\mu$m, and more typically of about 30 $\mu$m or less. The particle size of the pigment should also be selected to maintain pigment dispersion stability in the ink, and it is generally desirable to use smaller sized particles for maximum color strength. Accordingly, pigment dispersion particles having a size in the range of from about 50 $\mu$m to about 200 nm, and more preferably less than about 120 nm, are preferred.

Pigments which are suitable for use in the present compositions include, but are not limited to, azo pigments such as condensed and chelate azo pigments; polycyclic pigments such as phthalocyanines, anthraquinones, quinacridones, thioindigoids, isoindolinones, and quinophthalones; nitro pigments; daylight fluorescent pigments; carbonates; chromates; titanium oxides; zinc oxides; iron oxides and carbon black. In one embodiment, the pigment is other than a white pigment, such as titanium dioxide. Preferred pigments employed in the ink composition include carbon black and pigments capable of generating a cyan, magenta and yellow ink. Suitable commercially available pigments include, for example, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3. The pigments may be prepared via conventional techniques.

The ink compositions also include a dispersant, typically for dispersing the pigment therein. The dispersant may be polymeric or nonpolymeric. The term "polymeric dispersant" as used herein, is meant to include homopolymers, copolymers, terpolymers and immiscible and miscible polymer blends. Suitable non-polymeric dispersants include naphthalene sulfonic acid, sodium lignosulfate and glycerol stearate. Numerous polymeric dispersants are known in the art and are suitable for use in the present compositions. The polymeric dispersant may comprise a random polymer or a structured polymer, for example a block copolymer and/or branched polymer, or mixtures thereof, and the dispersant polymer may be anionic, cationic or nonionic in nature. Suitably, polymers having both hydrophilic sections for aqueous compatibility and hydrophobic sections for interaction with the pigment are preferred.

A further component of the aqueous ink jet compositions is the humectant. Humectants for use in ink jet ink compositions are known in the art and are suitable for use herein. Examples include, but are not limited to, alcohols, for example, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and monoalcohols such as n-propanol and iso-propanol. Preferably the humectants are selected from the group consisting of 2,2'-thiodiethanol, glycerol, 1,3-propanediol, 1,5-pentanediol, polyethylene glycol, ethylene glycol, diethylene glycol, propylene glycol, tetraethylene glycol, 2-pyrrolidinone, n-propanol and mixtures thereof. In a preferred embodiment, the humectant comprises a mixture of alcohols. In a further preferred embodiment, the humectant comprises a mixture of 2,2'-thiodiethanol and a glycol such as a polyalkylene glycol.

The latex binder is employed in the ink jet ink compositions in order to improve the water-fastness of a printed recording medium, particularly as measured by wet-rub resistance. The latex binder is particularly advantageous in that it improves the wet-rub resistance while maintaining good print quality and good optical density, particularly after heating printed images. Additionally, the latex binder resists film formation on the nozzle plate and allows the ink compositions to properly eject from the nozzles during the printing operation. Accordingly, clogging of the nozzles by the ink composition is prevented.

The latex binder is formed by emulsion polymerization of selected components. Particularly, a combination of first and second monomers is employed in combination with a charge stabilizing agent, an emulsifier and an initiator. The first monomer is typically regarded as a harder monomer, i.e., a monomer having a higher glass transition temperature Tg, while the second monomer is conventionally considered a softer monomer, i.e., a monomer having a relatively lower glass transition temperature Tg. Reference within the present disclosure to the glass transition temperature of a monomer refers more specifically to the glass transition temperature of a homopolymer formed from the particular monomer. More specifically, the latex binders are formed from first monomer having a glass transition temperature Tg greater than about 70° C. and comprising styrene, substituted styrene, methyl methacrylate or a mixture thereof. Substituted styrenes include alkyl-substituted styrenes, halogen-substituted styrenes and the like. In a preferred embodiment, the first monomer, or mixture thereof, has an average glass transition temperature Tg of about 100° C., or greater. The second monomer has a glass transition temperature Tg less than about 0° C. and comprises at least one $C_2$–$C_{10}$ alkyl acrylate. Examples of suitable alkyl acrylates include, but are not limited to, ethyl acrylate, propyl acrylate, butyl acrylate, octyl acrylate, ethylhexyl acrylate and the like. Preferably, the second monomer has a glass transition temperature Tg less than about –25° C., and more preferably less than about –50° C. The ratio of the first and second monomers may be varied so that the latex binder has a glass transition temperature Tg in the range of from about 0° C. to 70° C. and depending on additional desired properties for the latex binder. In a preferred embodiment, however, the latex binder is formed from at least about 50 weight percent of the first monomer, based on the weight of the first and second monomers, and more preferably comprises at least about 75 weight percent of the first monomer, based on the weight of the first and second monomers.

The reaction medium for preparing the latex binder employs both a charge stabilizing agent and an emulsifier in order to obtain the desired particle size. Particularly, the latex binder has an average particle size as measured by a Honeywell UPA 150 light scattering instrument of from about 150 nm to about 350 nm, and more preferably from about 200 nm to about 300 nm, and most preferably from about 250 nm to about 280 nm. Various charge stabilizing agents are known in the art and are suitable for use in preparing the latex binder of the present compositions. In a preferred embodiment, the charge stabilizing agent comprises methacrylic acid, acrylic acid, and/or a salt thereof. Sodium salts of methacrylic acid and/or acrylic acid are particularly preferred. The charge stabilizing agent may be employed in conventional amounts, and preferably in an amount of from about 0.1% to about 5% by weight of the emulsion polymerization components. Various emulsion polymerization emulsifiers are also known in the art and suitable for use in the present methods. However, in a preferred embodiment, the emulsifier comprises a fatty acid ether sulfate, and more preferably comprises a lauryl ether sulfate. Suitably, the emulsifier may be employed in conventional amounts and preferably in an amount of from about 0.1% to about 5% by weight of the emulsion polymerization components. Lauryl ether sulfate is preferred for obtaining inks which require low printer maintenance and provide good printer reliability.

The emulsifier is employed not only to obtain the desired particle size of the latex binder but further to obtain the desired surface tension of the latex binder in the range of from about 40 dynes/cm to about 60 dynes/cm. More preferably, the latex binder has a surface tension of from about 45 dynes/cm to about 55 dynes/cm, and even more preferably has a surface tension of about 50 dynes/cm.

The emulsion polymerization is conducted in accordance with conventional polymerization techniques, for example in a semi-batch process. The latex is synthesized by free radical initiated polymerization, and any free radical initiator known in the art may be employed. Preferably, the initiator comprises a per compound such as a persulfate, peroxygen, or the like. Persulfate initiators such as ammonium persulfate are particularly preferred. The initiator may be employed in conventional amounts and suitably is employed in an amount of from about 0.01 to about 5 weight percent, based on the weight of the emulsion polymerization components.

The aqueous ink jet ink compositions according to the present invention may employ the pigment, humectant, dispersant and latex binder in amounts suitable for obtaining desired print properties. In preferred embodiments, the aqueous compositions comprise, by weight, from about 1% to about 20% pigment, from about 5% to about 50% humectant, from about 0.01% to about 10% dispersant, and from about 1% to about 20% latex binder. More preferably, the compositions comprise, by weight, from about 1% to about 10% pigment, from about 10% to about 30% humectant, from about 0.1% to about 5% dispersant, and from about 1% to about 10% latex binder. Even more preferred are compositions comprising, by weight, from about 1% to about 5% pigment, from about 15% to about 25% humectant, from about 0.1% to about 4% dispersant, and from about 2% to about 5% latex binder.

The ink compositions may further include conventional additives known in the art. For example, the compositions may comprise one or more biocides to allow long term stability. Suitable biocides include benz-isothiazolin-one, methyl-isothiazolin-one, chloro-methyl-isothiazolin-one, sodium dihydroacetate, sodium sorbate, sodium 2-pyridinethiol-1-oxide, sodium benzoate and sodium pentachlorophenol. Examples of commercially available biocides are Zolidine™, Proxel™, Givguard™, Canguard 327™ and Kathon® PFM. The compositions may further include fungicides, bactericides, penetrants, surfactants, anti-kogation agents, anti-curling agents and/or buffers, various examples of which are known in the art. The inkjet ink compositions suitably have a pH of from about 8.0 to about 8.5.

The aqueous ink jet ink compositions may be prepared in accordance with conventional processing techniques. Typically, the pigment is combined with the dispersant to provide a pigment dispersion which is then combined with additional components of the compositions. The compositions may be employed in ink jet printing methods in a conventional manner, wherein a droplet of the ink composition is ejected through a printhead nozzle in response to an electrical signal and onto a surface of a paper recording medium. In one embodiment, a printed image is heated to improve its wet rub resistance. For example, a recording medium may be passed through a heating zone at a temperature greater than about 70° C., preferably greater than about 100° C., to improve the wet rub resistance of printed images thereon.

In one embodiment of ink jet printing methods according to the present invention, a droplet of an aqueous ink jet ink composition is ejected through a printhead nozzle and onto a surface of a paper recording medium, after which the paper recording medium with the aqueous ink jet ink composition on a surface thereof is passed through a fuser system at a temperature greater than about 100° C. for about 5 to about 100 seconds. In this embodiment, the aqueous ink jet ink composition preferably comprises, by weight, from about 0.8% to about 20% pigment, from about 5% to about 50% humectant, from about 0.01% to about 10% dispersant, and from about 1% to about 20% latex binder. The latex binder has a glass transition temperature Tg of from about 0° C. to about 70° C. and a particle size of from about 150 nm to about 350 nm. By passing the printed recording medium through the fuser system, the wet-rub resistance of an ink composition is substantially improved while maintaining good print quality and optical stability. In a preferred embodiment, the fuser system is operated at a temperature greater than about 100° C. and the paper recording medium passes through the fuser system for about 20 to about 60 seconds.

This method may be employed with various types of paper recording mediums, including plain papers such as copy paper, report paper and bond paper, as well as pretreated papers such as coated and glossy papers.

In additionally preferred embodiments of these methods, pressure is applied to the paper recording medium in the fuser system. For example, pressure may be applied to one side of the recording medium or, more preferably, to both sides of the recording medium. Suitable pressures applied to the paper recording medium in the fuser system are in the range of from about 15 psi to about 30 psi, and more preferably from about 18 psi to about 26 psi.

The ink jet ink compositions and ink jet printing methods according to the present invention provide printed recording mediums which exhibit improved wet-rub resistance. The improved wet-rub resistance is obtained while maintaining good print quality and optical density and without causing printer maintenance problems or printer failure owing to clogged nozzles and the like.

Advantages and improvements of the compositions and methods of the present invention are demonstrated in the following examples. In the examples and throughout the present specification, parts and percentages are by weight unless otherwise specified. The examples are illustrative only and are not intended to limit or preclude other embodiments of the invention.

EXAMPLE 1

In this example, the preparation of a latex binder 1 suitable for use in the ink jet ink compositions of the present invention is described. A pre-emulsion is made by mixing 0.3 g sodium lauryl ether sulfate emulsifier, 25 g deionized water, 6 g butyl acrylate, 28 g styrene, 1 g acrylic acid sodium salt (charge stabilizing agent) and 0.05 g ammonium persulfate initiator. To a round bottom flask equipped with a thermometer, a pressure equalized addition funnel and an argon gas connector, 0.1 g sodium lauryl ether sulfate, 28 g deionized water, 0.05 g ammonium persulfate and 7 g of the pre-emulsion are added. The mixture is purged with a vigorous stream of argon for 5 minutes. With a continued slow purge of argon, the flask is heated to 75° C. in an oil bath. After the reaction is initiated for 30 minutes, the remainder of the pre-emulsion is added through the addition funnel dropwise while maintaining the temperature at 75° C. After this addition is complete, the mixture is heated at 75° C. for 3–4 hours. A solution of 0.05 g ammonium persulfate in 1 ml deionized water is then added to the flask. The reaction runs for one additional hour and the reaction medium is then cooled to room temperature and filtered through a 5 μm filter. Additional sodium lauryl ether sulfate may be added to bring the surface tension of the resulting latex to 50 dynes/cm. The average particle size of the latex binder 1 is about 280 nm. The Tg of the latex is about 70° C. while the yield of the reaction is over 96%.

EXAMPLE 2

In this example, the preparation of a latex binder 2 suitable for use in the ink jet ink compositions of the present invention is described. A pre-emulsion is made by mixing 0.3 g sodium oleyl stearate sulfate emulsifier, 25 g deionized water, 6 g butyl acrylate, 28 g methyl methacrylate, 1 g acrylic acid sodium salt (charge stabilizing agent), and 0.05 g ammonium persulfate initiator. To a round bottom flask as described in Example 1, 0.1 g sodium oleyl stearate sulfate, 28 g deionized water, 0.05 g ammonium persulfate and 7 g of the pre-emulsion are added. The mixture is purged with a vigorous stream of argon for 5 minutes. With a continued slow purge of argon, the flask is heated to 65° C. in an oil bath. After the reaction is initiated for 30 minutes, the remainder of the pre-emulsion is added through the addition fennel dropwise while maintaining the temperature at 65° C. After this addition, the mixture is heated at 65° C. for 3–4 hours. A solution of 0.05 g ammonium persulfate in 1 ml deionized water is then added to the flask. The reaction runs for one additional hour and the reaction medium is then cooled ambient conditions for at lest 24 hours. If all of the nozzles eject properly after the desired time period of not less than 24 hours, the start-up maintenance is rated as "0". On the other hand, when less than 80% of the nozzles do not eject properly after the indicated time period, the start-up maintenance is poor and is rated as "2". Idling maintenance is a stressful maintenance algorithm used to show an ink's feasibility in a particular printhead, relative to other tested inks, with a rating of "0" indicating a good performance and a rating of "2" indicating a poor performance, relative to the control ink.

The results of inks described herein are set forth in Table 1.

TABLE 1

| Ink | Optical Density | Ambient Wet Rub Resistance | Heated Wet Rub Resistance | Start Up Maintenance | Idling Maintenance |
| --- | --- | --- | --- | --- | --- |
| Latex 1 | 1.31–1.49 | 6 | 0 | 0 | 0 |
| Latex 2 | 1.31–1.51 | 6 | 0 | 0.5 | 0 |
| Control | 1.20–1.56 | 6 | 6 | 0 | 0 |

The results set forth in Table 1 indicate that the ink compositions containing the latex binders of Examples 1 and 2 exhibited significantly improved wet rub resistance as compared with the control ink after heating, while also maintaining good optical density and good printer maintenance performance.

EXAMPLE 4

This example demonstrates a printing method employing a fusing step according to the present invention. Ink jet compositions as described below are employed in an ink jet printer to record images on paper recording mediums.

| Component | Weight Percent |
| --- | --- |
| pigment | 0.5–10 |
| dispersant | 0.1–2 |
| humectant | 5–40 |
| latex binder | 3–10 |
| penetrant | 0.1–5 |
| biocide | 0–2 | to room temperature and filtered through a 5 μm filter. The surface tension of the latex is generally from about 50 dynes/cm to 55 dynes/cm. The average particle size of the latex binder 2 is about 280 nm. The Tg of the latex is about 70° C. while the yield of the reaction is over 96%.

EXAMPLE 3

Ink jet ink compositions are prepared by mixing 2,2'-thiodiethanol, PEG 400, n-propanol, and deionized water. A latex binder 1 (from Example 1) or 2 (from Example 2) is added to the mixture in a thin stream and mixing is continued for another 10 minutes. A pigment dispersion is then added to the mixture in a thin stream and mixing is continued for an additional 10 minutes. The pH is adjusted to 8.0 to 8.5 with a 20% weight potassium hydroxide solution. The resulting ink compositions comprise, by weight, 10% 2,2'-thiodiethanol, 10% PEG 400, 2% n-propanol, 5% (solid) latex binder 1 or 2, 3% pigment and 0.6% dispersant, and a balance of water.

Each ink is then filled into an ink jet printhead with a nozzle diameter of less than 30 nm. After the cartridges are filled with ink, printing is performed. Printing is also performed using a comparative control ink which does not include the latex binder. The optical density of the printed images is measured. Wet-rub resistance is tested two ways. First, the ambient wet-rub resistance is tested by smearing a print sample with water about 24 hours after the print sample has been generated. Second, the radiant heat (or fuse/roller) wet-rub resistance is tested by generating a print sample, passing it through a print zone heater reaching a temperature greater than about 100° C., and smearing the print with water. A rating of "0" for wet-rub resistance signifies that the print, and hence the ink, was not disturbed in any way, while a rating of "6" for wet-rub resistance signifies that the print was significantly disturbed.

Start up maintenance for a particular ink is an indication of how well the printhead containing the ink behaves or recovers after it has been sitting at water 15–60

After depositing the ink compositions on the paper recording medium, the paper recording mediums are passed through a fuser system at a temperature of about 200° C. for about 20 to about 60 seconds while about 11 psi pressure is applied to each side of the paper. The resulting printed images are wet rub and highlighter smear resistant. Additionally, the inks remain stable after 60 days at 60° C.

The foregoing examples and various preferred embodiments of the present invention set forth herein are provided for illustrative purposes only and are not intended to limit the scope of the invention defined by the claims. Additional embodiments of the present invention and advantages thereof will be apparent to one of ordinary skill in the art and are within the scope of the invention defined by the following claims.

We claim:

1. An aqueous ink jet ink composition, comprising, by weight, from about 1% to about 20% pigment, from about 5% to about 50% humectant, from about 0.01% to about 10% dispersant, and from about 1% to about 10% latex binder formed from first monomer having a glass transition temperature Tg greater than about 70° C. and selected from the group consisting of styrene, substituted styrene, methyl methacrylate, and a mixture thereof, second monomer having a glass transition temperature Tg less than about 0° C. and selected from the group consisting of a $C_2$–$C_{10}$ alkyl acrylates, charge stabilizing agent, lauryl ether sulfate emulsifier, and initiator, the latex binder being formed of greater than 75 weight percent of the first monomer, based on the weight of the first and second monomers, and the latex binder having a glass transition temperature Tg of from about 0° C. to about 70° C., an average particle size of from about 150 nm to about 350 nm, and a surface tension of from about 40 dynes/cm to about 60 dynes/cm.

2. An aqueous composition as defined by claim 1, comprising, by weight, from about 1% to about 10% pigment, from about 10% to about 30% humectant, from about 0.1% to about 5% dispersant, and from about 1% to about 10% latex binder.

3. An aqueous composition as defined by claim 1, comprising, by weight, from about 1% to about 5% pigment, from about 15% to about 25% humectant, from about 0.1% to about 4% dispersant, and from about 2% to about 5% latex binder.

4. An aqueous composition as defined by claim 1, wherein the first monomer has a glass transition temperature Tg of about 100° C.

5. An aqueous composition as defined by claim 1, wherein the second monomer has a glass transition temperature Tg less than about −25° C.

6. An aqueous composition as defined by claim 1, wherein the second monomer has a glass transition temperature Tg less than about −50° C.

7. An aqueous composition as defined by claim 1, having a particle size of from about 200 nm to about 300 nm.

8. An aqueous composition as defined by claim 1, having a surface tension of from about 45 dynes/cm to about 55 dynes/cm.

9. An aqueous composition as defined by claim 1, wherein the humectant comprises a mixture of two or more alcohols.

10. An aqueous composition as defined by claim 9, wherein the humectant comprises a mixture of a 2,2'-thiodiethanol and a polyalkylene glycol.

11. An aqueous composition as defined by claim 1, having a pH of from about 8.0 to about 8.5.

12. A method of ink jet printing, comprising ejecting a droplet of an aqueous ink jet ink composition through a nozzle and onto a surface of a paper recording medium, the aqueous ink jet ink composition comprising, by weight, from about 1% to about 20% pigment, from about 5% to about 50% humectant, from about 0.01% to about 10% dispersant, and from about 1% to about 10% latex binder formed from first monomer having a glass transition temperature Tg greater than about 70° C. and selected from the group consisting of styrene, substituted styrene, methyl methacrylate, and a mixture thereof, second monomer having a glass transition temperature Tg less than about 0° C. and selected from the group consisting of a $C_2$–$C_{10}$ alkyl acrylates, charge stabilizing agent, lauryl ether sulfate emulsifier, and initiator, the latex binder being formed of greater than 75 weight percent of the first monomer, based on the weight of the first and second monomers, and the latex binder having a glass transition temperature Tg of from about 0° C. to about 70° C., an average particle size of from about 150 nm to about 350 nm, and a surface tension of from about 40 dynes/cm to about 60 dynes/cm.

13. A method of ink jet printing, comprising ejecting a droplet of an aqueous ink jet ink composition through a nozzle and onto a surface of a paper recording medium, and passing the paper recording medium with the aqueous ink jet ink composition on a surface thereof through a fuser system at a temperature greater than about 100° C. for about 5 to about 100 seconds, wherein the aqueous ink jet ink composition comprises, by weight, from about 1% to about 20% pigment, from about 5% to about 50% humectant, from about 0.01% to about 10% dispersant, and from about 1% to about 10% latex binder, wherein the latex binder is formed from first monomer having a glass transition temperature Tg greater than about 70° C. and selected from the group consisting of styrene, substituted styrene, methyl methacrylate, and a mixture thereof, second monomer having a glass transition temperature Tg less than about 0° C. and selected from the group consisting of $C_2$–$C_{10}$ alkyl acrylates, charge stabilizing agent, lauryl ether sulfate emulsifier, and initiator, wherein the latex binder is formed of greater than 75 weight percent of the first monomer, based on the weight of the first and second monomers, and wherein the latex binder has a glass transition temperature of from about 0° C. to about 70° C. and a particle size of from about 150 nm to about 350 nm.

14. A method as defined by claim 13, wherein the paper recording medium is in the fuser system fore about 20 to about 60 seconds.

15. A method as defined by claim 13, wherein pressure is applied to the paper recording medium in the fuser system.

16. A method as defined by claim 13, wherein from about 15 psi to about 30 psi of pressure is applied to the paper recording medium in the fuser system.

17. A method as defined by claim 13, wherein from about 18 psi to about 26 psi of pressure is applied to the paper recording medium in the fuser system.

18. A method as defined by claim 13, wherein pressure is applied to each side of the paper recording medium in the fuser system.

19. A method as defined by claim 13, wherein the first monomer has a glass transition temperature Tg of about 100° C.

20. A method as defined by claim 13, wherein the second monomer has a glass transition temperature Tg less than about −25° C.

21. A method as defined by claim 13, wherein the second monomer has a glass transition temperature Tg less than about −50° C.

22. A method as defined by claim 13, wherein the charge stabilizing agent comprises an acrylic acid salt, a methacrylic acid salt, or a mixture thereof.

23. A method as defined by claim 13, wherein the initiator comprises a radical initiator.

24. A method as defined by claim 13, wherein the latex binder has a particle size of from about 200 nm to about 300 nm.

25. A method as defined by claim 13, wherein the latex binder has a surface tension of from about 45 dynes/cm to about 55 dynes/cm.

* * * * *

UNITED STATES PATENT AND TRADEMARK OFFICE
CERTIFICATE OF CORRECTION

PATENT NO. : 6,498,202 B1
DATED : December 24, 2002
INVENTOR(S) : Sun et al.

It is certified that error appears in the above-identified patent and that said Letters Patent is hereby corrected as shown below:

Column 7,
Line 63, cancel beginning with "cooled ambient conditions" to and including "water 15-60" in Column 9, line 12, and insert the following:

-- cooled to room temperature and filtered through a 5 µm filter. The surface tension of the latex is generally from about 50 dynes/cm to 55 dynes/cm. The average particle size of the latex binder 2 is about 280 nm. The Tg of the latex is about 70°C while the yield of the reaction is over 96%.

EXAMPLE 3

Ink jet ink compositions are prepared by mixing 2,2'-thiodiethanol, PEG 400, n-propanol, and deionized water. A latex binder 1 (from Example 1) or 2 (from Example 2) is added to the mixture in a thin stream and mixing is continued for another 10 minutes. A pigment dispersion is then added to the mixture in a thin stream and mixing is continued for an additional 10 minutes. The pH is adjusted to 8.0 to 8.5 with a 20% weight potassium hydroxide solution. The resulting ink compositions comprise, by weight, 10% 2,2'-thiodiethanol, 10% PEG 400, 2% n-propanol, 5% (solid) latex binder 1 or 2, 3% pigment and 0.6% dispersant, and a balance of water.

Each ink is then filled into an ink jet printhead with a nozzle diameter of less than 30 nm. After the cartridges are filled with ink, printing is performed. Printing is also performed using a comparative control ink which does not include the latex binder. The optical density of the printed images is measured. Wet-rub resistance is tested two ways. First, the ambient wet-rub resistance is tested by smearing a print sample with water about 24 hours after the print sample has been generated. Second, the radiant heat (or fuse/roller) wet-rub resistance is tested by generating a print sample, passing it through a print zone heater reaching a temperature greater than about 100°C, and smearing the print with water. A rating of "0" for wet-rub resistance signifies that the print, and hence the ink, was not disturbed in any way, while a rating of "6" for wet-rub resistance signifies that the print was significantly disturbed.

UNITED STATES PATENT AND TRADEMARK OFFICE
CERTIFICATE OF CORRECTION

PATENT NO. : 6,498,202 B1
DATED : December 24, 2002
INVENTOR(S) : Sun et al.

It is certified that error appears in the above-identified patent and that said Letters Patent is hereby corrected as shown below:

(continued)

Start up maintenance for a particular ink is an indication of how well the printhead containing the ink behaves or recovers after it has been sitting at ambient conditions for at lest 24 hours. If all of the nozzles eject properly after the desired time period of not less than 24 hours, the start-up maintenance is rated as "0". On the other hand, when less than 80% of the nozzles do not eject properly after the indicated time period, the start-up maintenance is poor and is rated as "2". Idling maintenance is a stressful maintenance algorithm used to show an ink's feasibility in a particular printhead, relative to other tested inks, with a rating of "0" indicating a good performance and a rating of "2" indicating a poor performance, relative to the control ink.

The results of inks described herein are set forth in Table 1.

TABLE 1

| Ink | Optical Density | Ambient Wet Rub Resistance | Heated Wet Rub Resistance | Start Up Maintenance | Idling Maintenance |
|---|---|---|---|---|---|
| Latex 1 | 1.31-1.49 | 6 | 0 | 0 | 0 |
| Latex 2 | 1.31-1.51 | 6 | 0 | 0.5 | 0 |
| Control | 1.20-1.56 | 6 | 6 | 0 | 0 |

The results set forth in Table 1 indicate that the ink compositions containing the latex binders of Examples 1 and 2 exhibited significantly improved wet rub resistance as compared with the control ink after heating, while also maintaining good optical density and good printer maintenance performance.

UNITED STATES PATENT AND TRADEMARK OFFICE
CERTIFICATE OF CORRECTION

PATENT NO. : 6,498,202 B1
DATED : December 24, 2002
INVENTOR(S) : Sun et al.

It is certified that error appears in the above-identified patent and that said Letters Patent is hereby corrected as shown below:

(continued)

EXAMPLE 4

This example demonstrates a printing method employing a fusing step according to the present invention. Ink jet compositions as described below are employed in an ink jet printer to record images on paper recording mediums.

| Component | Volume Percent |
|---|---|
| pigment | 0.5-10 |
| dispersant | 0.1-2 |
| humectant | 5-40 |
| latex binder | 3-10 |
| penetrant | 0.1-5 |
| biocide | 0-2 |
| water | 15-60 --. |

Signed and Sealed this

Thirteenth Day of May, 2003

JAMES E. ROGAN
*Director of the United States Patent and Trademark Office*